United States Patent [19]

Francis

[11] 4,343,444
[45] Aug. 10, 1982

[54] TILT COMPENSATING PENDULUM FOR SEAT MOUNTED RETRACTOR

[75] Inventor: Philip L. Francis, Bloomfield Hills, Mich.

[73] Assignee: Allied Corporation, Morris Township, Morris County, N.J.

[21] Appl. No.: 193,688

[22] Filed: Oct. 3, 1980

[51] Int. Cl.³ .................... A62B 35/02; B65H 75/48
[52] U.S. Cl. ......................... 242/107.4 A; 297/478
[58] Field of Search ............. 242/107.4 R–107.4 E; 297/478, 480; 280/806

[56] References Cited

U.S. PATENT DOCUMENTS

| | | | |
|---|---|---|---|
| 3,946,965 | 3/1976 | Singh | 242/107.4 A |
| 4,063,695 | 12/1977 | Oshikawa | 242/107.4 A |
| 4,101,093 | 7/1978 | Colasanti et al. | 242/107.4 A |
| 4,164,337 | 8/1979 | Blom | 242/107.4 A |
| 4,166,592 | 9/1979 | Barcus et al. | 242/107.4 A |

Primary Examiner—John M. Jillions
Attorney, Agent, or Firm—Roger H. Criss

[57] ABSTRACT

A pendulum for a retractor to be mounted on a tiltable vehicle seat in which the pendulum cap is tiltable in the direction of seat tilt prior to actuation by a collision force.

9 Claims, 6 Drawing Figures

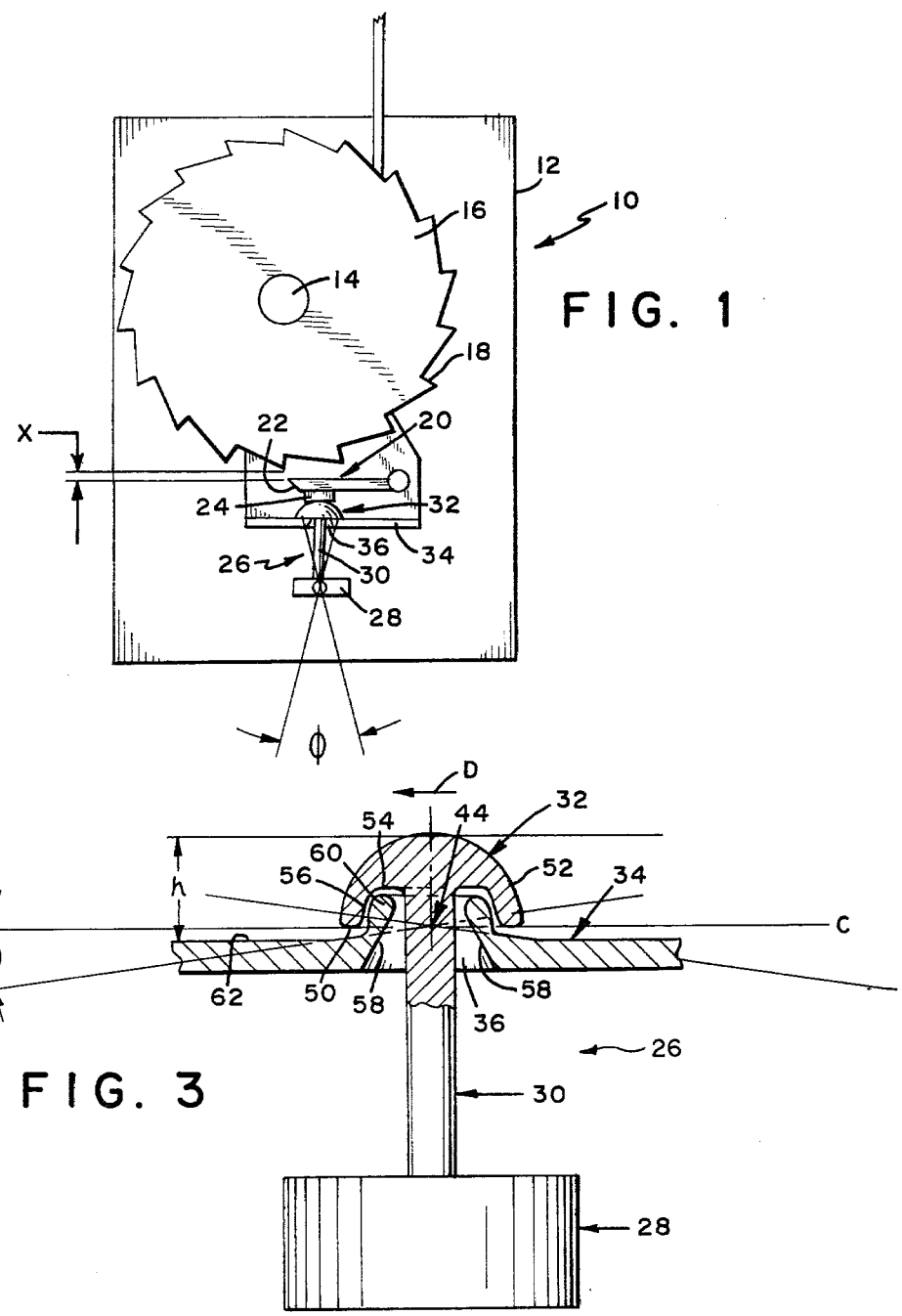

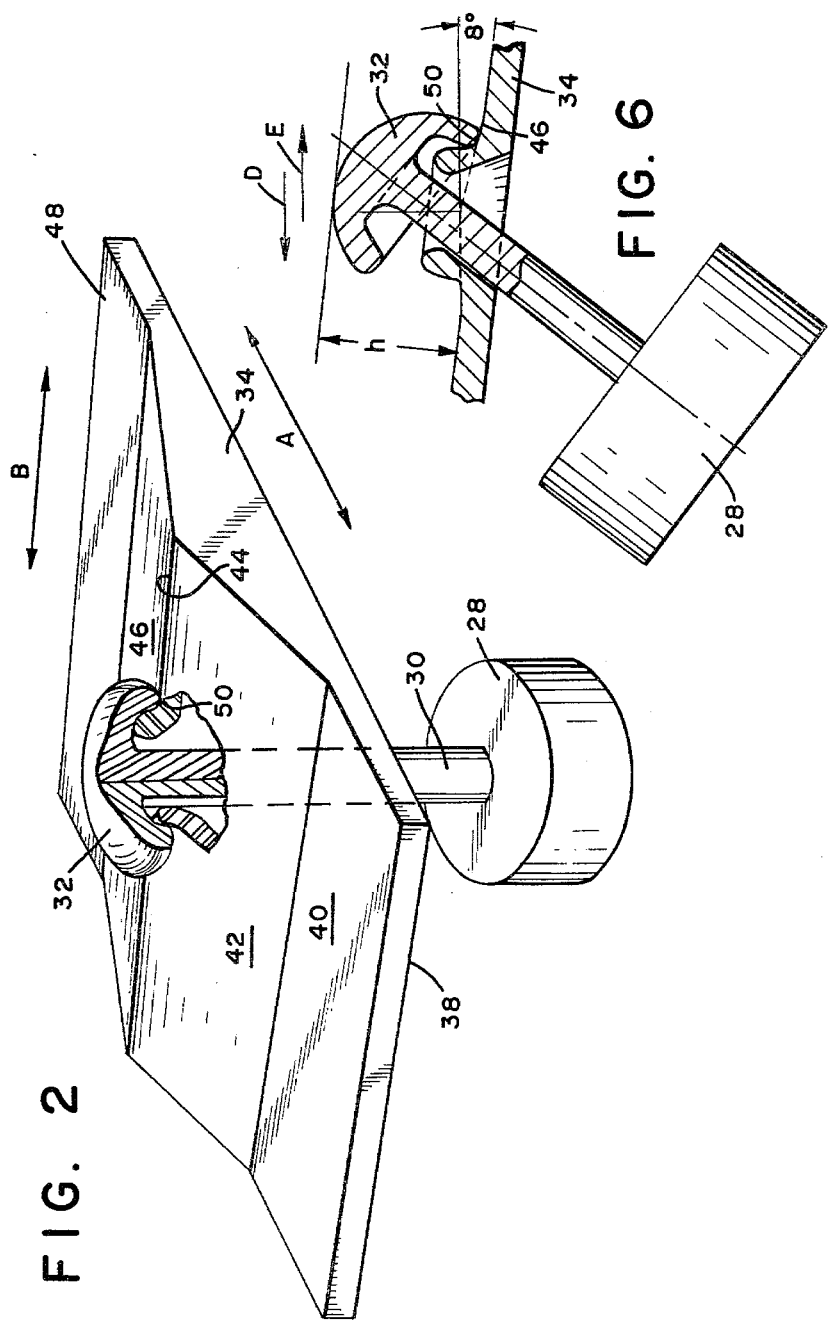

TILT COMPENSATING PENDULUM FOR SEAT MOUNTED RETRACTOR

BACKGROUND OF THE INVENTION

1. Field of the Invention

This invention relates to an inertia sensor for a seat mounted seat belt retractor.

2. Description of the Prior Art

Seat belt retractors are typically mounted on a structural part of the vehicle adjacent to the vehicle seat or in the roof. It has been suggested, especially with passive seat belt systems, to amount the retractors directly to the vehicle seats in order to eliminate most of the relative motion of the retractor to occupant at the time of seat adjustment. Such a system can work quite well with a manually adjusted seat provided that a suitable load transferring mechanism is utilized. However, mounting of a vehicle sensitive retractor on power adjusted seat structures which include the ability for tilting forwards and backwards from the horizontal presents problems of adequately compensating for tilting of the inertia sensor associated with the vehicle sensitive retractor. Typical motorized seats are capable of tilting up to 8 degrees or more in the forwards and reverse directions.

It would be desirable to provide a tilt compensating inertia sensor for a seat belt retractor intended for mounting on a tiltable vehicle seat.

SUMMARY OF THE INVENTION

In accordance with this invention, there is provided an inertia sensor for a seat belt retractor adapted for installation on a seat in a vehicle capable of tilting a predetermined angle in at least one direction with respect to a normal horizontal position of the seat, the sensor comprising:

a weighted mass extending by an elongated stem from a cap member; and a support structure for supporting the cap member of the weight mass, the support structure comprising: an opening through which the stem extends, first surface means in contact with the cap member, the first surface means preventing motion of the cap member in directions substantially normal to the longitudinal axis of the vehicle below a predetermined deceleration of the vehicle in such directions, and a second surface means normally spaced from the cap member when the seat is in its normal horizontal position and the second surface means being effective to restrict tilting motion of the cap member in a direction substantially parallel to the longitudinal axis to a predetermined degree approximately equal to the predetermined angle of tilting, the second surface means permitting motion of the pendulum cap above said predetermined deceleration force acting along said direction substantially parallel to the longitudinal axis of the vehicle.

This invention provides a system in which little or no work is done in the initial movement of the pendulum so that the kinetic energy resulting from a deceleration force can be used to lift the pendulum cap sufficiently to move a lock dog associated with a ratchet wheel on the retractor into its lock position. The sensor permits the pendulum cap to tilt up to the angle of tilt of the vehicle seat and permits full motion of the pendulum through an angle up to twice the angle of tilt in a direction opposite to the direction of tilt in the event of a deceleration force acting in such opposite direction, without imparting a lifting force to the lock dog, at which time the deceleration force, which is above a predetermined amount, results in a pivoting action of the pendulum cap and hence locking of the retractor. The design of the present invention permits tilting of the pendulum cap in the direction of the longitudinal axis of the vehicle to adjust for forward and rearward motion of the power seat, while restricting lateral motion until the predetermined deceleration value is reached.

BRIEF DESCRIPTION OF THE DRAWINGS

FIG. 1 is a schematic view of a vehicle sensitive seat belt retractor incorporating the inertia sensor of this invention.

FIG. 2 is a perspective view of the inertia sensor of this invention.

FIG. 3 is a cross-section view of the inertia sensor of this invention.

FIG. 6 is a view similar to view FIG. 5 showing the pendulum in its final position.

DESCRIPTION OF THE PREFERRED EMBODIMENTS

Figure 4:
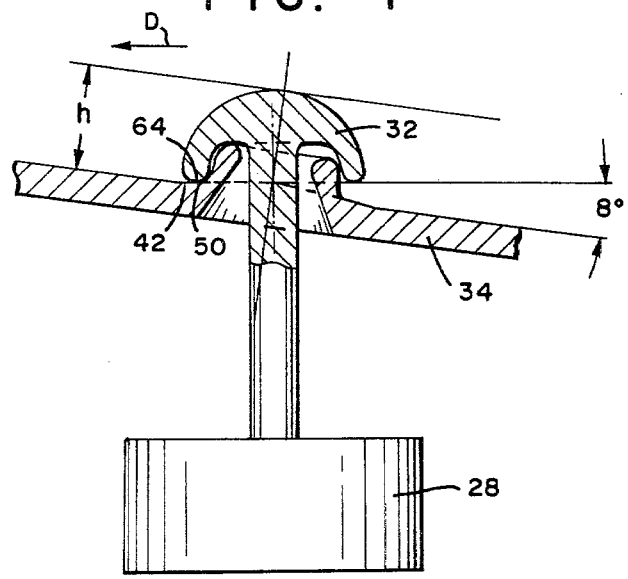
FIG. 4 is a view similar to FIG. 3 when the retractor is tilted in a rearwards direction.

With reference to FIG. 1, a vehicle sensitive retractor 10 intended for installation on a power seat in a vehicle is shown. Retractor 10 includes a frame 12 which supports a rotatable shaft 14 on which one or more ratchet wheels 16 having peripheral ratchet teeth 18 is directly or indirectly supported. A pawl 20 is pivotably supported in frame 12 and includes an edge 22 adapted for engagement with ratchet teeth 18 and a lower surface 24 for engagement with the cap of a pendulum. An inertia sensor generally indicated at 26 includes a weighted pendulum 28 suspended by a stem 30 from a pendulum cap 32. A support structure 34 is also mounted to frame 12 and includes an opening 36 through which stem 30 extends.

It can be seen that in the normal horizontal position of retractor 10, pawl edge 22 is spaced a distance X from the retractor teeth. This distance is generally referred to as the air gap and must be overcome to lock the retractor.

Pendulum cap 32 is tiltable on support structure 34. The angle required to tip the pendulum in order for pendulum cap 32 to lift off and pivot off the support structure 34 to lift pawl 20 is referred to as the detent angle and is represented by $\phi$. A deceleration force must be sufficient to overcome this detent angle in order to lift the pawl for its motion towards ratchet teeth 18.

Current requirements in the United States for seat belt retractors include the requirement that the retractor must not lock up when tilted to 15 degrees and must lock up dynamically at 0.7 g or less. The no-lock angle is the result of a combination of the detent angle and the air gap and, for example, a typical installation would provide for a detent angle of about 12 degrees and an air gap which produces another 5 degrees, resulting in a total of 17 degrees which is above the tilt requirement.

Referring to FIG. 2, the support structure 34 includes a bottom surface 38, a forward section 40, a first inclined surface 42 extending upwardly from section 40 and terminating at a ridge 44, and a second inclined surface 46 extending downwardly from ridge 44 to a rearward section 48. The major plane of the support structure 34 extends substantially parallel to the longitudinal axis of the vehicle represented by arrow A and it can be seen that ridge 44 extends generally normal to arrow A and parallel to the transverse axis B of the vehicle. Ridge 44 may be rounded for ease of manufacture.

Pendulum cap 32 has a generally mushroom shape and the outer peripheral surfaces 50 intersect with ridge 44 and are supported by ridge 44 in the transverse direction whereas surfaces 50 intersected by the major plane of the support structure 34 extend above surfaces 42 and 46 by a distance which is determined by the angle of tilt compensation as is more particularly shown in FIGS. 3-6.

With reference to FIG. 3, inertia sensor 26 is shown with the seat and hence the retractor in its normal horizontal attitude. Pendulum cap 32 has a mushroom shape as indicated above and includes a generally hemispherical outer surface 52 terminating in rounded peripheral bottom surfaces or edges 50. The underside surfaces 54 of cap 32 are connected to bottom surfaces 50 via rounded section 56, as well as to the pendulum stem 30. Aperture 36 in support structure 34 is defined by upwardly inclined conical surfaces 58 connected to a rounded rim 60 which extends above the outer surface 62 of support structure 34. Rim 60 serves to restrict lateral shifting of pendulum cap 32.

Peripheral surfaces 50 are supported as viewed in FIG. 3 by ridge 44 which is shown by a point in the drawing and which point is extended by line C to show the angle of tilt compensation $\theta$ which is between the ridge line 44 and the respective inclined surface of the support member 34. It can be seen that in the forwards direction of the vehicle, depicted by arrow D, the peripheral bottom surfaces 50 of pendulum cap 32 are spaced from the outer surface 62 of support 34. This is also true in the rearward direction. Thus cap 32 can tilt on ridge 44 in both the forwards and rearwards directions until the surface 50 contacts surface 62 at either of the inclined surfaces 42 or 46. It should be noted that ridge 44 is generally parallel to the axis of the seat tilt. The distance between the top of the pendulum cap and the support surface is shown as h. With respect to FIG. 4, the inertia sensor 26 is shown when the retractor is tilted an angle of 8 degrees to the rear as the seat is pivoted rearwards. It should be noted that pendulum 28 is operable to move the pawl (not shown) as a result of a force parallel to arrow D. The distance h between the top of the pendulum cap and surface 62 has remained the same as in FIG. 3. The full compensation angle of 8 degrees has been utilized, with cap 32 pivoting on ridge 44 until its lower surface 50 is in contact with inclined surface 42. Accordingly, upon a rearward impact, pendulum 32 is capable of pivoting upwards with portion 64 of cap 32 bearing against surface 42 and thus lift the pawl into contact with the ratchet wheel. Such motion would occur when pendulum 28 has gone through a pivot equal to the detent angle, which may be chosen such as 12 degrees depending upon respective geometries. A deceleration force acting from the rear above a predetermined amount required to pivot the pendulum through its detent angle would be sufficient to lift the pendulum cap and thereby lock the retractor. It can thus been seen that the sensor 26 acts as a normal sensor with respect to action of a deceleration force acting in the same direction as the direction of tilt.

Figure 5:
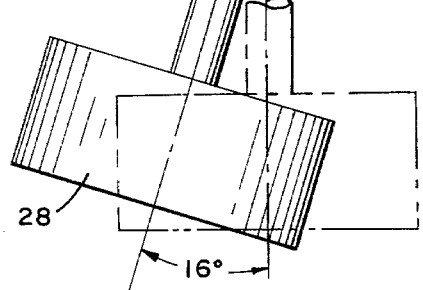
FIG. 5 is a view similar to FIG. 3 when the retractor is tilted rearwardly and the pendulum has moved as a result of a deceleration force.

FIG. 5 depicts the same rearward tilt angle and the initial results of movement of the pendulum following a frontal impact which would be in a direction of arrow E. The initial position of pendulum 28 is shown in dotted lines. It can be seen that pendulum 28 has traveled through an angle of 16 degrees and the distance h has still remained constant as in FIGS. 3 and 4. Thus, for a rotation in the opposite direction of the tilt of an amount equal to twice the tilt angle, no lifting of the pendulum cap occurs and hence the pawl is not lifted upwardly. Thus, very little energy is required to move the pendulum to its position at which it is ready to lift the pawl as a result of a deceleration force sufficient to move the pendulum through its predetermined detent angle.

FIG. 6 shows the result of such a higher deceleration force acting on pendulum 28 after it has swung through its FIG. 5 position. Lower surface 50 of pendulum cap 32 has pivoted on inclined surface 46 of support member 34 to an extent such that the distance h between the top of the pendulum cap and the surface 62 of support member 34 has increased above that shown in FIGS. 3-5. As a reslt, a lifting action is transferred to the pawl and the retractor is in a position to lock up.

It should be noted that pendulum 28 is at all times capable of responding to deceleration forces acting in any directions. For example, in the transverse direction, the pendulum cap begins to lift at the predetermined detent angle, such as 12 degrees and pivots on ridge 44 as a result of a predetermined deceleration force equivalent to move the pendulum through its detent angle. In the longitudinal direction, cap 32 can tilt up to the tilting angle of the seat in a given direction and then pivot to its lock position as a result of a deceleration force greater than that necessary to overcome the detent angle.

In this manner, it is possible to provide an inertia sensor for a seat belt retractor for mounting on a tiltable vehicle seat without increasing the actuating detent angle above an amount which could otherwise result in actuation of the pendulum at a g force above the desired amount, such as 0.7 g or lower.

Although in the above description reference has been made to an inertia sensor for a seat belt retractor intended for installation in a tiltable vehicle seat, it is to be understood that the inertia sensor could alternatively be employed in a retractor which is intended for an unusually high angle of mounting in a vehicle and would be attached to a structural part of the vehicle.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. An inertia sensor for a seat belt retractor adapted for installation on a seat in a vehicle capable of tilting a predetermined angle in at least one direction with respect to a normal horizontal position of said seat, said sensor comprising:
   a weighted mass extending by an elongated stem from a cap member; and
   a support structure for supporting said cap member of said weighted mass, said support structure comprising: an opening through which said stem extends, first surface means in contact with said cap member, said first surface means preventing motion of said cap member in directions substantially normal to the longitudinal axis of said vehicle in response to a deceleration force acting on said vehicle in such directions below a predetermined value, and a second surface means normally spaced from said cap member when said seat is in its normal horizontal position, said second surface means comprising an inclined surface extending in a direction substantially parallel to said longitudinal axis and intersecting said first surface means, said second surface means being effective to restrict tilting motion of said cap member in a direction substantially parallel to said longitudinal axis to a predetermined degree approximately equal to said predetermined angle of tilting without imparting a lifting force to said cap member, said second surface means being effective to permit tilting motion of said cap member in said direction substantially parallel to said longitudinal axis at the occurrence of a deceleration of said vehicle in said direction above said predetermined value.

2. The inertial sensor of claim 1 wherein said second surface means comprises inclined surfaces spaced from said cap member in both forwards and rearwards directions along said longitudinal axis and effective to restrict tilting motion of said cap member in said forwards and rearwards directions to said predetermined degree.

3. The inertia sensor of claim 2 wherein said cap member has a generally mushroom shape, the underside of said cap member being supported by said first surface means.

4. The inertia sensor of claim 3 wherein said second surface means comprises a first inclined surface extending upwards in a first direction and a second inclined surface extending upwards in a second direction opposite to said first direction and into contact with said first inclined surface, said first surface means comprising the surface of said contact between said first and second inclined surfaces.

5. The inertia sensor of claim 4 wherein said first surface means comprises an apex surface formed by said first and second inclined surfaces.

6. The inertia sensor of claim 5 wherein said support structure includes a raised wall surrounding said opening, said raised wall adapted to restrict lateral motion of said cap member.

7. In a seat belt retractor for installation in a vehicle, said retractor comprising a frame, locking means on said frame operable to lock said retractor and an inertia sensor for actuating said locking means, said inertia sensor comprising a weighted mass extending by an elongated stem from a cap member and a support member for supporting said cap member, said support member having an opening through which said stem extends, the improvement comprising:

first surface means on said support member in contact with said cap member, said first surface means preventing motion of said cap member in directions substantially normal to the longitudinal axis of said vehicle in response to a deceleration force below a predetermined value; and second surface means normally spaced from said cap member when said frame is in a horizontal position, said second surface means comprising an inclined surface extending in a direction substantially parallel to said longitudinal axis and intersecting said first surface means, said second surface means being effective to restrict tilting motion of said cap member in a direction substantially parallel to said longitudinal axis to a predetermined degree without imparting a lifting force to said cap member, said second surface means being effective to permit tilting motion of said cap member in said direction substantially parallel to said longitudinal axis at the occurrence of a deceleration of said vehicle in said direction above said predetermined value.

8. The retractor of claim 7 wherein said second surface means comprises a first inclined surface extending upwards in a first direction and a second inclined surface extending upwards in a second direction opposite to said first direction and into contact with said first inclined surface, said first surface means comprising the surface of contact between said first and second inclined surfaces.

9. The retractor of claim 8 wherein said first surface means comprises an apex surface formed by said first and second inclined surfaces.

* * * * *